United States Patent [19]

Ducret

[11] 4,169,400
[45] Oct. 2, 1979

[54] CABLE ARMOR CUTTING MACHINE

[76] Inventor: Lucien C. Ducret, 8 Apache Pl., Riverside, Conn. 06878

[21] Appl. No.: 900,434

[22] Filed: Apr. 27, 1978

Related U.S. Application Data

[63] Continuation-in-part of Ser. No. 703,669, Jul. 8, 1976, Pat. No. 4,103,578.

[51] Int. Cl.² .............................................. B26D 7/02
[52] U.S. Cl. ........................................ 83/409; 83/419; 83/437; 83/447; 83/464; 83/466; 83/467 R; 83/477.2; 83/522; 83/924; 30/90.3
[58] Field of Search ................ 83/409, 419, 437, 447, 83/464, 466, 467, 477.2, 522, 924; 30/90.3, 90.8, 91.1, 91.2

[56] References Cited

U.S. PATENT DOCUMENTS

| | | | |
|---|---|---|---|
| 2,176,646 | 10/1939 | Thatcher | 30/90.3 |
| 2,396,442 | 3/1946 | Shaver et al. | 30/90.3 X |
| 3,093,023 | 6/1963 | Vail | 30/90.3 X |
| 3,851,387 | 12/1974 | Ducret | 30/90.3 |
| 3,959,877 | 6/1976 | Zorzenon | 30/90.3 |

*Primary Examiner*—Frank T. Yost
*Attorney, Agent, or Firm*—DeLio and Montgomery

[57] ABSTRACT

A cutter for the armor of a BX cable or the like wherein the cable to be cut is held firmly in a cable guide by a manually actuated cable clamp, the clamped cable being movable into armor-cutting engagement with a fixed power driven circular saw, and means for fine adjustment of the cable, clamp and saw being provided.

11 Claims, 15 Drawing Figures

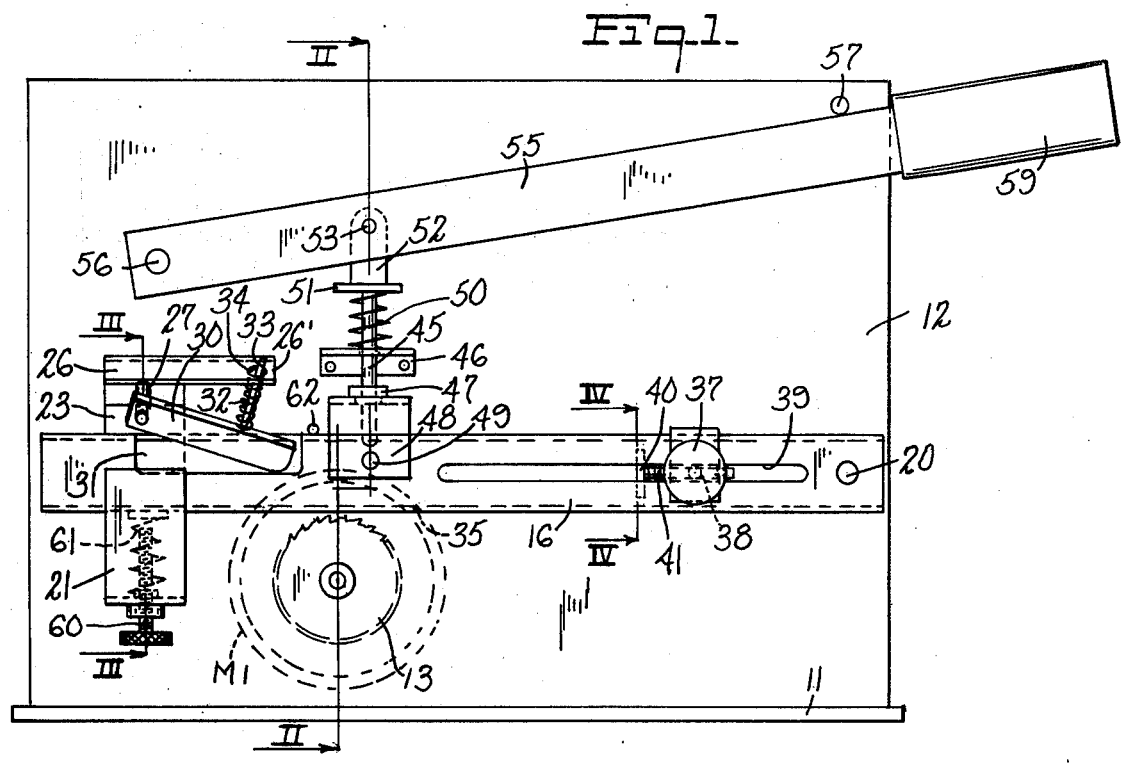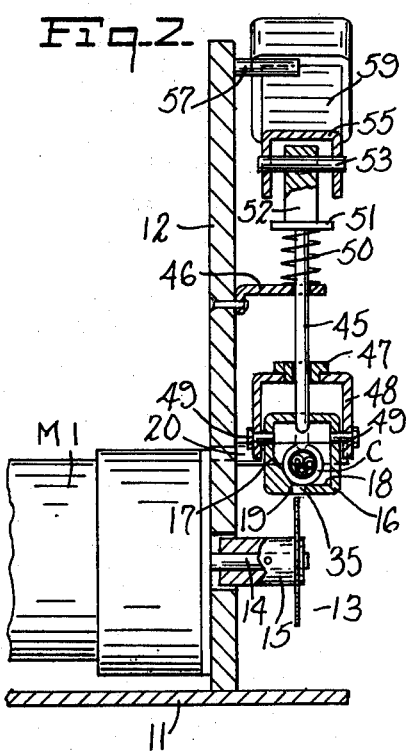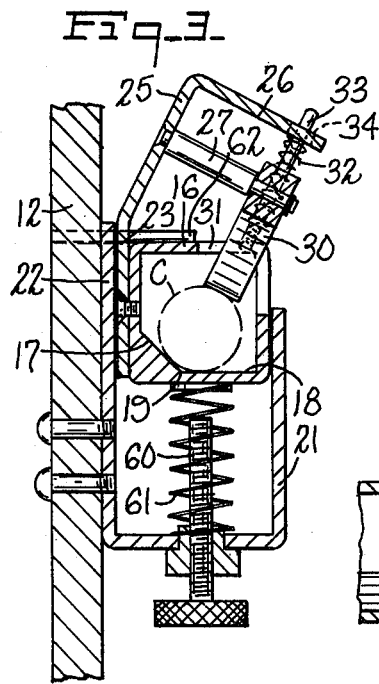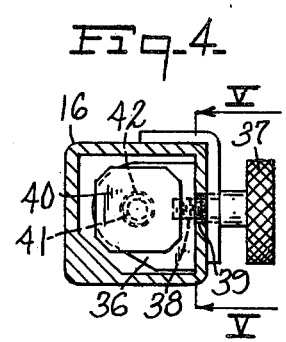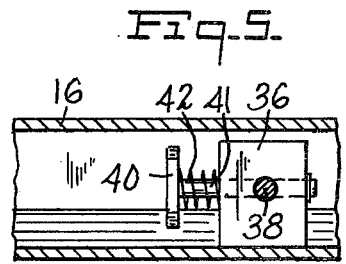

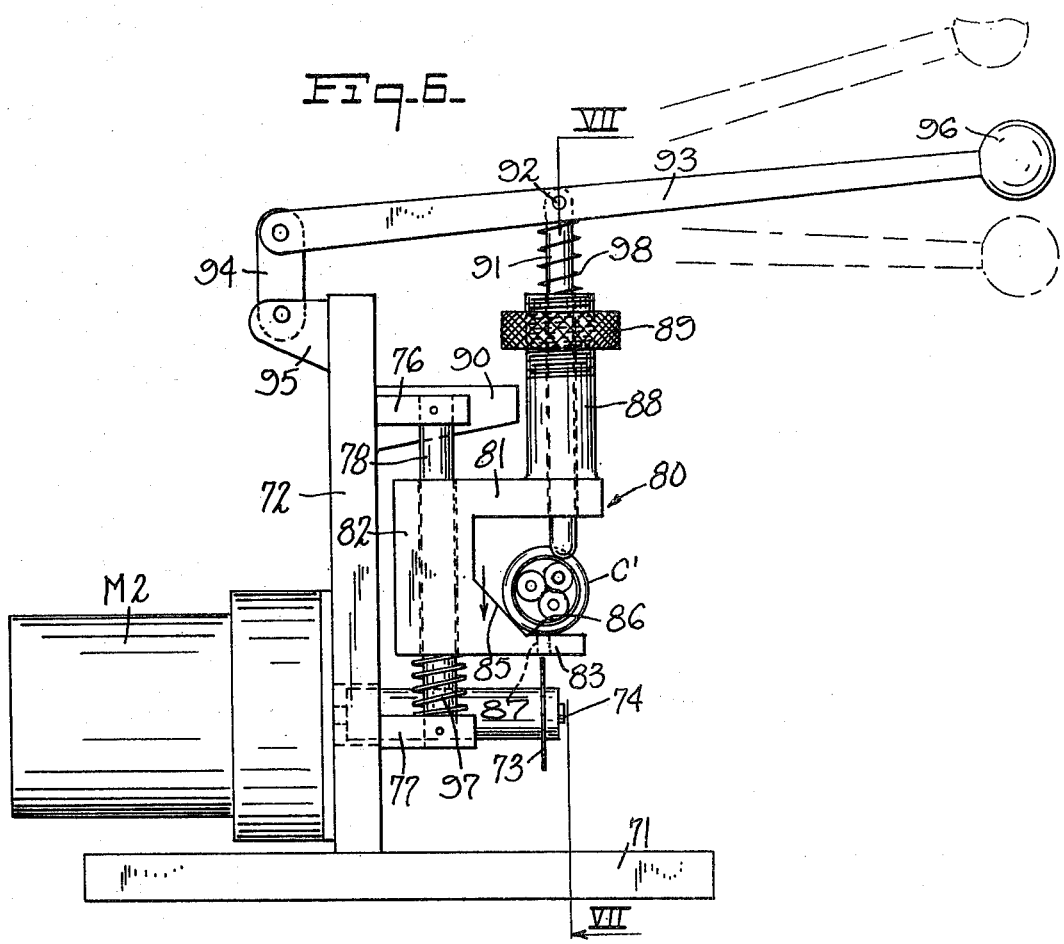
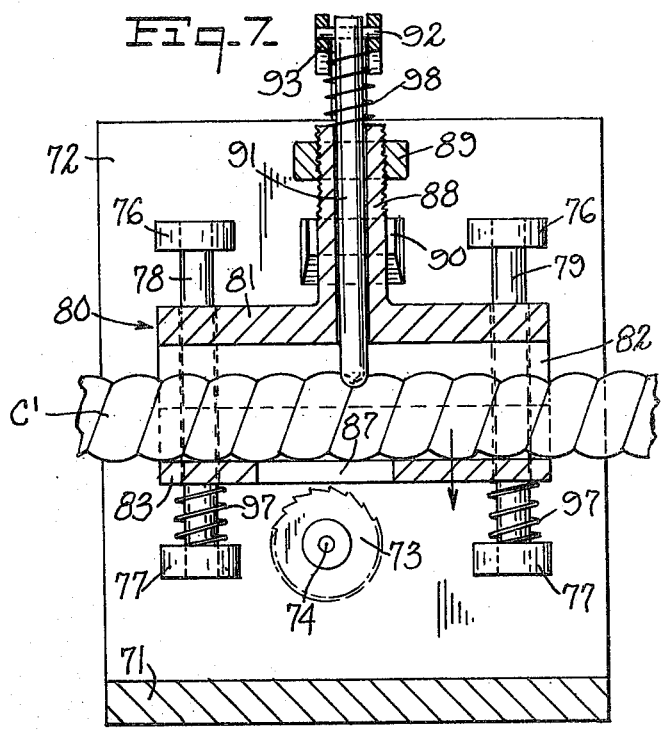

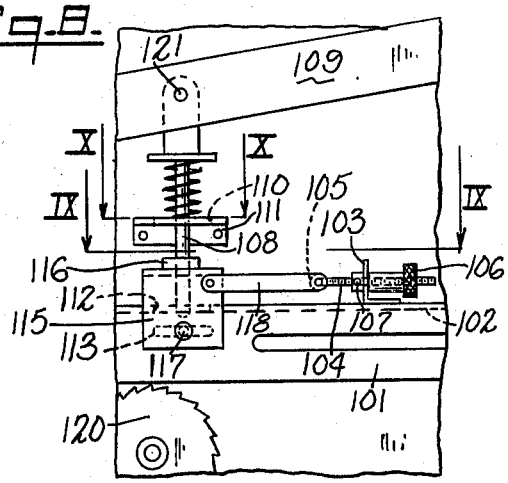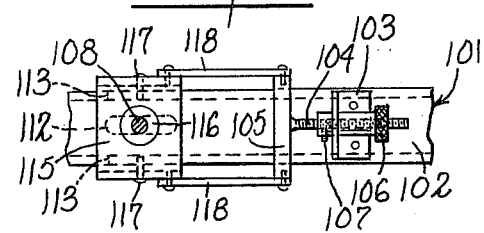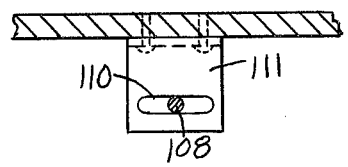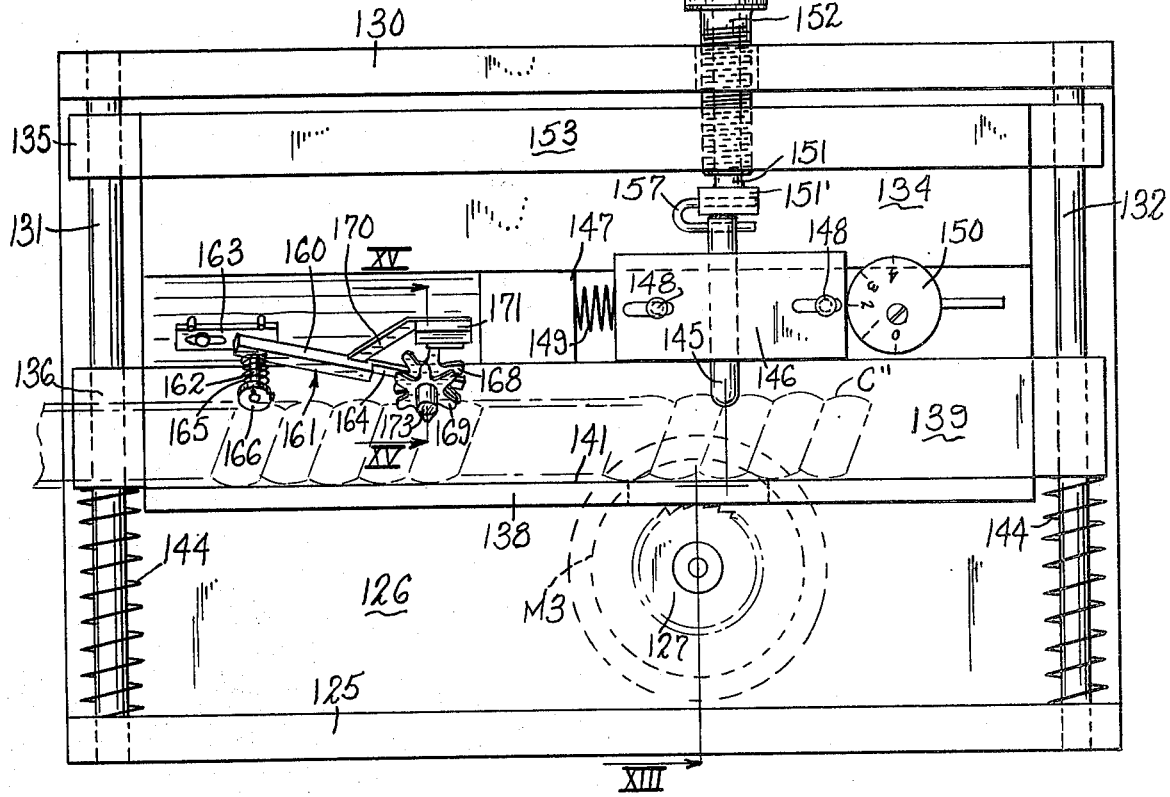

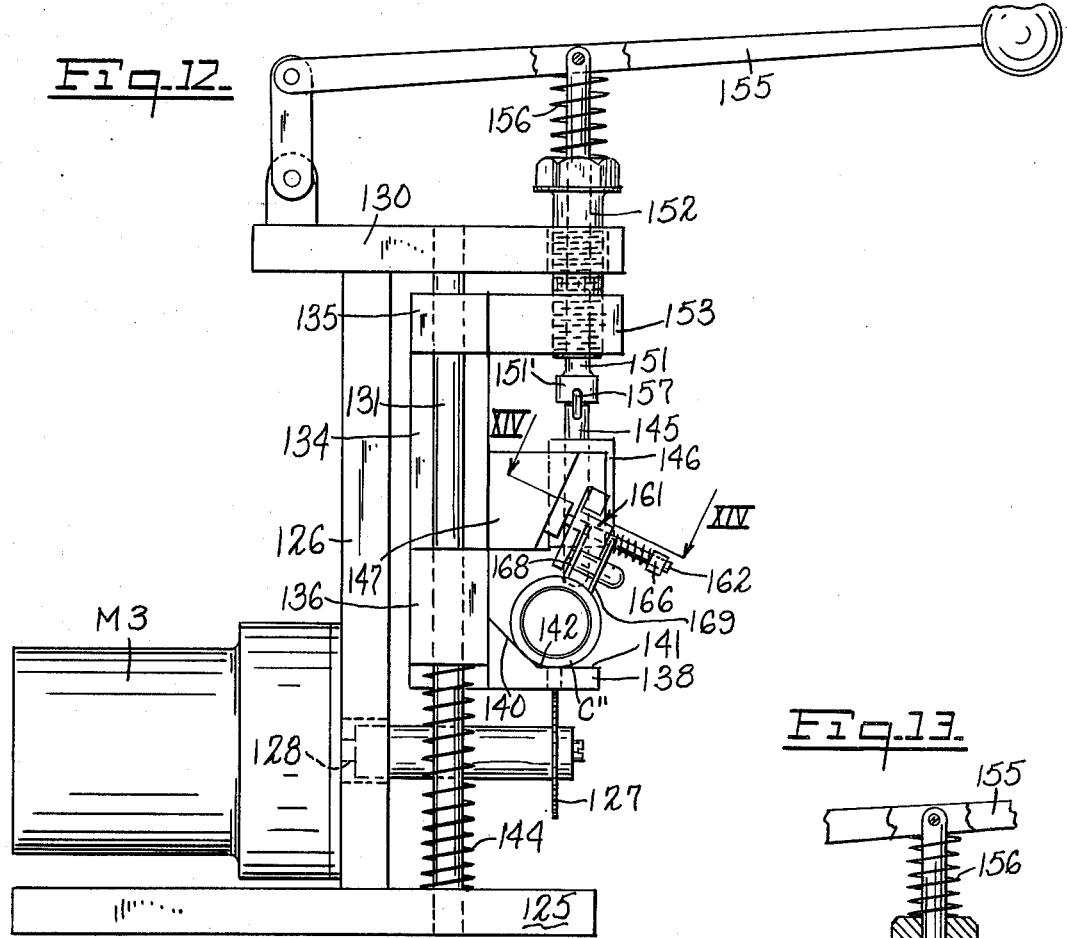
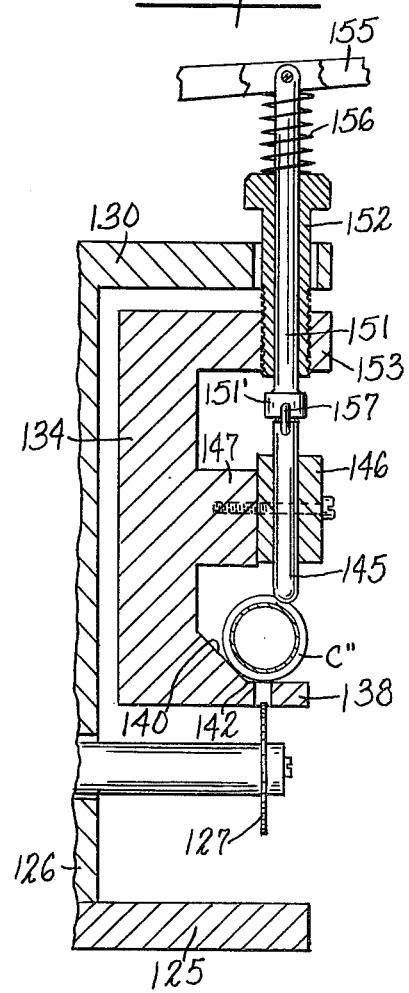
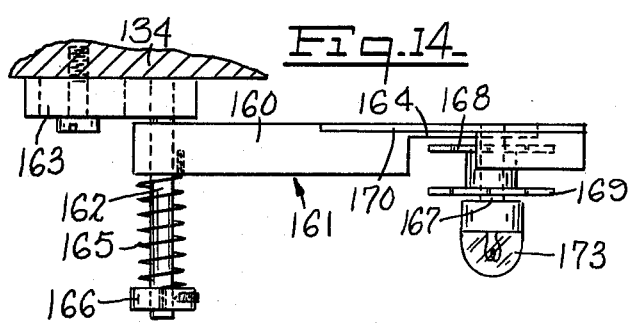
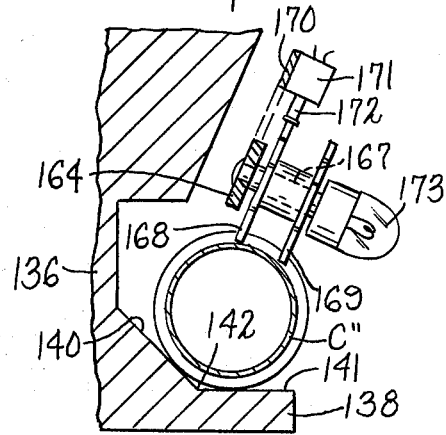

CABLE ARMOR CUTTING MACHINE

This application is a continuation-in-part of application Ser. No. 703,669, filed July 8, 1976, now U.S. Pat. No. 4,103,578 Aug. 1, 1978.

This invention relates to a cutter for the armor of a BX cable or the like comprising a stationary base or stand having a motor driven circular saw mounted thereon, a cable guide movable relative to the saw, a cable clamp associated with the cable guide and manually actuated means for clamping the cable in the guide and moving the guide and cable into a position where the saw can cut the cable armor.

Hand held and manually operated devices have been developed to replace the use of hack saws or files in the cutting of shielded conduits, such as BX cable and the like, so that the armor can be cut accurately, with precisely limited penetration (if any) into the cable. An example of such a device is shown in applicant's U.S. Pat. No. 3,851,387.

In certain manufacturing and/or assembly operations it may be necessary to cut and remove armor from the ends of a substantial number of pieces of BX cable, such that manual holding and sawing is arduous and time consuming.

It is accordingly an object of the invention to provide a motor driven cutting machine, adapted to receive and cut accurately the armor on BX cable in a range of sizes, wherein the only required manual effort consists in clamping the cable in proper position and moving the clamped cable against the saw blade.

It is a further object of the invention to provide a simple cable armor cutting machine carried by a base or stand which is readily portable or can be fixed to a bench or other support.

It is another object of the invention to provide a cutting machine with readily accessible adjustable means for limiting the depth of cut.

It is a still further object of the invention to provide certain improvements in form, construction and arrangement of the several parts whereby the above-named and other objects may effectively be attained.

The invention accordingly comprises the features of construction, combination of elements and arrangement of parts which will be exemplified in the combination hereinafter set forth, and the scope of the invention will be indicated in the claims.

Practical embodiments of the invention are shown in the accompanying drawings, wherein:

FIG. 1 represents a side elevation of a first form of the tool;

FIG. 2 represents a vertical section on the line II—II of FIG. 1;

FIG. 3 represents a detail vertical section on the line III—III of FIG. 1;

FIG. 4 represents a detail vertical section on the line IV—IV of FIG. 1 showing the adjustable stop;

FIG. 5 represents a detail vertical section on the line V—V of FIG. 4;

FIG. 6 represents an intake end elevation showing a modified form of tool;

FIG. 7 represents a vertical section on the line VII—VII of FIG. 6.

FIG. 8 represents a detail side elevation of a cable clamp fine adjustment means, applicable to the tool of FIG. 1;

FIG. 9 represents a horizontal section on the line IX—IX of FIG. 8;

FIG. 10 represents a detail horizontal section on the line X—X of FIG. 8;

FIG. 11 represents a side elevation of a modified form of tool, based on the tool of FIGS. 6 and 7;

FIG. 12 represents an end elevation of the tool of FIG. 11, viewed from the left of FIG. 11;

FIG. 13 represents a vertical section on the line XIII—XIII of FIG. 11;

FIG. 14 represents a detail sectional view of the cable position sensing means on the line XIV—XIV in FIG. 12; and FIG. 15 represents a detail vertical section on the line XV—XV of FIG. 11.

Referring to the drawings, and particularly FIGS. 1 to 5, the cable cutter comprises a base plate 11 on which is mounted a vertical wall 12, as a support for all working parts of the machine.

The circular saw blade 13 is carried by the drive shaft 14 of a gear motor M-1, fixed on the back of the wall 12, the shaft 14 being journaled and pinned in a bushing 15 which passes horizontally through the wall and locates the saw blade at a suitable distance from the front face of the wall.

The cable guide 16 is an elongated tube of substantially square external cross-section, but with its lower inner corner beveled to provide a slanting surface 17 which lies at an angle of about 135° to the bottom surface 18, the junction of said surfaces forming an apex 19, toward which the cable to be cut is urged, as explained below. The apex angle may vary within the range of about 100° to 170°, as more fully explained in the cited U.S. Pat. No. 3,851,387, which shows in FIG. 5 the geometry of this feature. At one end of the guide 16, remote from the entrance end, it is pivotally mounted on a post 20, projecting horizontally from the wall 12, and the entrance end of the guide is arranged to be vertically movable in a U-shaped bracket 21, fixed on the wall 12. Another bracket, 23, is fixed to the rear wall of the cable guide in a position to slide past the rear leg 22 of the bracket 21, the second bracket having a portion 25 angled forwardly and upwardly, and an end portion 26 angled forwardly and downwardly, forming a right angle with portion 25. A pivot pin 27 projects from portion 25, parallel with portion 26, and constitutes the pivotal support for the cable centering arm 30. The upper and outer walls of the guide tube 16 are cut away in the region of the arm 30 to provide an opening 31, through which the arm can swing to bring and maintain its free end portion in contact with a cable C (FIG. 3). The arm is biased toward the cable by a spring 32 on a pin 33 which is fixed on the arm 30 and projects freely through a slot 34 in a rearward extension 26' of the bracket portion 26. The bottom wall 18 is longitudinally slotted at 35, just beyond the arm 30, to permit the saw blade to engage the cable armor.

The parts just described are so proportioned and arranged that the cable-restraining force of the arm 30, biased by spring 32, acts in a plane which contains the apex 19 and bisects the angle formed by surfaces 17 and 18 at said apex. A force exerted in that plane is effective to hold a cable in proper position regardless of the diameter of the cable or the actual angle at the apex within the range previously specified.

In order to expose a terminal portion of a BX cable, the armor must be cut at a predetermined distance from the cable end. Such distances may vary, depending on the requirements of each installation, and uniform spacing of a cut from the cable end can be ensured by means of the adjustable stop shown in FIGS. 4 and 5, comprising the block 36 which is slidable in the cable guide 16 and is adapted to be locked in place by means of the tightening knob 37 on the threaded stud 38 which projects from the side of the block through a long horizontal slot 39 in the side wall of the cable guide. It is desirable to provide the block 36 with a spring-loaded bumper 40, carried by a pin 41 which passes through a bore in the block 36 and is held resiliently in extended position by the spring 42. The wall of the cable guide may be calibrated to indicate adjusted positions of the stop assembly for any given spacing of the armor cut from the cable end.

In accordance with the normal operating sequence, a cable end which is inserted in the guide and urged by the centering arm 30 to rest against the guide walls 17 and 18, is stopped by the bumper 40 and then has its axial position fixed by the clamp shown in FIGS. 1 and 2. The clamp comprises a plunger 45 which passes freely through a bracket 46 (on the wall 12) and through the bushing guide 47 on a yoke 48, the sides of which engage pivotally, by pins 49, the opposite side walls of the cable guide. The lower end of the plunger is so located that it will bear against the upper surface of a cable of any size within the capacity of the tool. Above the bracket 46 the plunger is provided with a spring 50 between the bracket and a washer or flange 51, the top of the plunger being fixed to a block 52 which is journaled by a pin 53 within the channel-shaped operating lever 55. The lever 55 is pivoted at 56 to the wall 12 near the cable input end of the machine and extends the full length of the machine past a stop 57, to terminate in a handle 59, projecting beyond the end of the wall 12.

In addition to the length adjustment by the stop assembly 36-42, the depth of cut can be controlled by means of the adjusting screw 60 passing through the bottom of the bracket 21 and adapted to be contacted by the bottom of the cable guide. The guide is maintained normally in its upper, non-cutting position by means of a strong spring 61 on the screw 60 which holds the guide against the stop pin 62 projecting from the wall 12.

In operation, the stop assembly 36-42 is set to determine the distance of the cut from the cable end, and the screw 60 is set to determine the depth of cut (i.e. usually just enough to sever two adjacent turns of the armor, with minimal penetration of the cable insulation). With the motor running and saw rotating, the cable end is inserted into the cable guide, beneath the centering arm 30, a sufficient distance to bring it in contact with the bumper 40 which may yield slightly. The handle 59 is depressed, compressing spring 50 and causing the plunger 45 to engage firmly the top of the cable, biasing it against wall 17 in the same manner as shown in FIG. 6; further downward movement of the handle forces the cable and cable guard 16, pivoted at 20, downward relative to the saw blade (against the force of spring 61) so that the saw enters the slot 35 and cuts the cable armor to a depth determined by the adjustment of screw 60. When pressure on the handle 59 is released the springs 50 and 61 will return the parts to the position shown in FIG. 1 and the cable may be withdrawn, the cut end of its armor now being readily removable.

A reason for the provision of the spring-loaded bumper 40, instead of a fixed stop, will be found in the fact that the BX cable presents a "corrugated" surface to the clamping plunger; if the end of the plunger hits a high point its engagement is unstable and if it hits a forwardly or rearwardly sloping area it will tend to cam the cable axially one way or the other. The limited resiliency of the bumper permits the cable end to adjust its position axially, by no more than half the width of a corrugation, to ensure firm engagement of the clamp with a low point on the cable surface, as illustrated in FIG. 7.

A modified form of the tool is shown in FIGS. 6 and 7, wherein the cable centering means (arm 30) and the stop assembly 36-42 are eliminated. In this machine the base plate 71, vertical wall 72, motor M-2 and saw 73 on drive shaft 74 are similar to the corresponding parts described above, except that the plate and wall are shorter.

The wall 72 is provided with two pairs of horizontally projecting upper and lower lugs 76, 77, constituting supports for the vertical shafts 78, 79. The cable guide 80 is in the form of an open-faced block having a top wall 81, a rear wall 82 and a bottom wall 83, the rear wall being traversed by vertical bores through which pass the shafts 78, 79, with a free sliding fit. A slanting surface 85 between the inner surfaces of walls 82 and 83 corresponds to the surface 17 in FIG. 3 and provides an apex 86 corresponding to apex 19, described above. A slot 87 is formed in the bottom wall 83, parallel to and spaced slightly from the apex 86, the slot 87 being aligned vertically with the saw blade to permit the latter to engage the armor of a cable C' seated in the guide adjacent the apex.

An externally threaded bushing 88 extends upward from the top guide wall 81, a collar 89 with built-in friction being threaded onto the bushing and being adapted to contact a fixed stop 90 projecting from the face of the wall 72. The cable clamping plunger 91 passes through the bushing 88 in a position such that its bottom end can engage an average sized cable at a point substantially diametrically opposite the apex 86, as shown in FIG. 6. The upper end of the plunger is pivotally engaged at 92 with the operating lever 93, the latter being pivotally connected by a link 94 to a fixed bracket 95 on the rear face of the wall 72 and having a handle 96.

The guide 80 is urged upwardly by relatively strong springs 96 on the shafts 78, 79 and the operating lever 93 is urged upwardly by a softer spring 98 between the top of the bushing 88 and the handle, adjacent the pivot 92.

In operation, a cable C' is inserted laterally into the open-faced cable guide and the motor is started, simultaneously or sequentially. The operating lever, being initially in its upper broken line position (FIG. 6) is depressed, compressing the spring 98 and bringing the plunger 91 into engagement with the cable armor (FIGS. 6 and 7). Upon further depression of the operating lever the guide 80 slides down on the shafts 78, 79 compressing the springs 97 and bringing the armor into cutting engagement with the saw blade. The distance through which the guide can move is determined by the adjustment of the collar 89, the depth of cut being limited accordingly.

It will be noted that this tool can cut the armor at any point, regardless of proximity to a cable end. It is important also that, in each form of the tool, the effort required of the operator consists merely in overcoming, with favorable leverage, the resistance of one or more springs in order to clamp the cable at a selected point and then feed it to the saw blade, all by the single movement of depressing a lever.

For accuracy in cutting of cable armor it is important to be able to adjust the axial position of the cable clamping pin or plunger relative to the saw blade and means for obtaining this result are shown in FIGS. 8 to 10. An elongated cable guide 101, corresponding to guide 16 in FIG. 1, has mounted on its upper wall 102 a bracket 103, bored to receive the threaded stem 104 of a yoke 105, the position of which is adjusted and maintained by the thumb nut 106 and set screw 107. The plunger 108, like plunger 45 in FIG. 1, is operatively connected to the lever 109 and passes through a slot 110 in the bracket 111. The cable guide has a similar slot 112 in its upper wall 102 as well as horizontal slots 113 in each of its side walls. An inverted U-shaped slide 115 is provided with a bushing 116 in its top portion, to receive and guide the plunger, and with pins 117 projecting inwardly from each side into a respective slot 113. The slide is connected by links 118 to ends of the yoke 105.

The mechanism just described can be used to adjust the position of the plunger 108 relative to the saw blade 120 by means of the thumb nut 106 and set screw 107, the plunger and slide being movable together in an arc around the point of connection 121 with the lever 109, the extent of movement being limited by the length of the slots 110, 112 and 113.

In FIGS. 11 to 15 there is shown a modified form of cutting machine based on the form shown in FIGS. 6 and 7 but including certain refinements and details.

The modified machine includes a base plate 125, vertical wall 126, motor M-3 and saw blade 127 mounted on the drive shaft 128. At the top of the wall is a flat top plate 130, fixed to the wall and extending sidewise and endwise the same distance as the base plate, on the operating side of the wall. Vertical shafts 131 and 132 are supported in the lower and upper ends in the base plate and top plate, respectively, to constitute supports for the cable guide.

The cable guide comprises a backing plate 134 having upper and lower bushings 135, 136 at each end and slidably engaging the respective shafts 131, 132. Along the lower edge of the plate 134 is a ledge 138, defining the bottom of the elongated recess 139 which has, in general, the same profile as the cable guide in FIG. 6, with a slanting surface 140, flat surface 141 and apex 142 toward which a cable C" is urged by the cable clamping plunger 145. The plate 134 is biased upwardly by the springs 144, under compression, on each of the shafts 131, 132.

The plunger 145 passes through a vertical bore in the guide block 146 which is mounted on the face of a horizontal rib 147 extending along the surface of the plate 134, the guide block being adjustably secured to the rib by means of set screws 148 which pass through horizontal slots in the block. Horizontal adjustment of the block (and plunger) is effected by means of the spring 149, under compression, which urges the block toward the eccentric dial 150, the screws 148 being loosened to permit movement of the block to its desired position, under control of the spring and dial, and tightened to hold the block firmly in place.

Vertical actuation of the plunger is effected by means of the push rod 151, slidable in the bushing 152 which is threaded in the flange 153 extending along the upper edge of the plate 134. At its upper end the rod is journaled on the operating lever 155 (like levers 55 and 109) and a spring 156 extends between the top of bushing 152 and the lever, to bias the rod upwardly. The connection between the plunger 145 and push rod 151 comprises the U-pin 157, one leg of which is fixed in the enlarged lower end 151' of the push rod and the other leg of which passes slidably through a horizontal hole in the upper end of the plunger, as most clearly shown in FIG. 11. This connection permits the plunger to move with the block 146 to any horizontally adjusted position while remaining operatively attached to the push rod for vertical actuation under control of the operating lever 155.

The mechanism shown in FIGS. 11 and 13, like that in FIGS. 8 to 10, enables the cable-engaging plunger to be adjusted relative to the saw blade in a manner to ensure cutting of the armor at exactly the optimum point for each different cable size or type. It is important to be able to set the machine for an inside spiral cut or overlapping spiral cut, when the integrity of the next convolution has to be protected, as when a connector is fastened to the armor. If the next convolution is cut too far a mechanical strain could result in breakage of the convolutions, destroying the mechanical joint between the armor and a connector and leaving the electrical wires inside the armor to keep the system together, with possible dangerous consequences.

The assembly shown at the left of FIG. 11 and in FIGS. 14 and 15 is adapted to monitor the position of the cable convolutions in relation to the plunger 145 and to give a visual signal when the cable, plunger and saw blade are properly located. This is desirable because the point of engagement of the plunger with the cable cannot readily be seen by the operator, particularly if the cable is large.

The wide portion 160 of the lever 161 is pivoted on the shaft 162 which is fixed to a longitudinally adjustable block 163. A spring 165 has one end fixed on the adjustable collar 166 and its other end engaging the lever 161 to bias it in a downward direction. Adjacent to its free end the lever is cut away to form a narrow portion 164 and provided with a short axle 167 carrying sprocket wheels 168, 169 which are fastened together and slightly offset so that the teeth in each adjacent pair can fit in the helical groove of a normal cable armor surface. The shaft 162 is so angled that the arc of movement of the lever 161 substantially intersects the apex 142 of the cable guide and lies in a diametral plane of any cable properly located in the guide, as clearly shown in FIG. 15. An arm 170 projects upwardly from the lever 161 and supports a microswitch 171, actuated by a trigger 172 aligned with the teeth of one of the wheels 168, 169 (e.g., 168). The microswitch closes a lower voltage circuit to a small bulb within the lens cap 173 which may conveniently be located on the end of the axle 167. When the plunger 145 has been adjusted to its desired position relative to the saw blade, as explained above, the monitoring assembly is adjusted to a position such that a sprocket tooth is in trigger-actuating position when the plunger is engaged in the cable groove. Thus the lighting of the bulb gives a clearly visible signal that the cable and the saw blade are precisely where they should be.

The monitoring assembly shown in FIGS. 11, 14 and 15 can be used in place of the cable centering arm 30 (FIGS. 1 and 3), since the effective force of spring 165 can be adjusted by means of the collar 166 to cause the sprockets to bear strongly against the cable in a direction to stabilize its position, as is evident from FIG. 15.

It will be observed that, while the plunger exerts its clamping effort always at a point substantially opposite the saw, the exact point of engagement can be adjusted within a limited range as desired in order to obtain optimum results.

It may thus be seen that the objects of the invention above, as well as those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

What I claim is:

1. A cable armor cutting machine comprising, a fixed support, a motor mounted on said support, a saw operatively connected to said motor, a cable guide connected to the support and movable toward and away from said saw, a cable clamping means movable into and out of engagement with the cable, and operating means adapted to move the clamping means into engagement with the cable at a point substantially opposite the saw and to move the cable into cutting engagement with the saw, the clamping means being a vertically movable plunger and the operating means including a lever pivotally connected at one end to the fixed support and connected to the plunger in a relation which provides a mechanical advantage to the operation of the plunger, the cable guide being elongated and pivoted at one end to the support, the opposite end being the cable input end, and cable centering means being carried by the guide adjacent said input end.

2. A cable armor cutting machine according to claim 1 wherein the cable guide has cable contacting surfaces lying in planes which intersect at an angle between 100° and 170° and the cable centering means is biased to urge the cable toward the apex of said angle.

3. A cable armor cutting machine according to claim 1 which includes a cable end stop in the cable guide and means for adjusting the position of said stop longitudinally of said guide.

4. A cable armor cutting machine according to claim 3 wherein the stop includes a spring-loaded bumper.

5. A cable armor cutting machine according to claim 1 which includes a U-shaped bracket on the support adjacent said input end of the cable guide, the guide being vertically movable in said bracket.

6. A cable armor cutting machine according to claim 5 wherein the bracket is provided with an adjustable stop for limiting the downward movement of the guide toward the saw.

7. A cable armor cutting machine comprising, a fixed support, a motor mounted on said support, a saw operatively connected to said motor, a cable guide connected to the support and movable toward and away from said saw, a cable clamping means movable into and out of engagement with the cable, operating means adapted to move the clamping means into engagement with the cable at a point substantially opposite the saw and to move the cable into cutting engagement with the saw, the clamping means being a vertically movable plunger and the operating means including a lever pivotally connected at one end to the fixed support and connected to the plunger in a relation which provides a mechanical advantage to the operation of the plunger, and means for adjusting the plunger relative to the saw in the direction longitudinally of the cable.

8. A cable armor cutting tool according to claim 7 wherein the plunger adjusting means includes means on the cable guide for changing the angle of the plunger relative to the operating lever.

9. A cable armor cutting tool according to claim 7 wherein the plunger adjusting means includes a sliding linkage between the plunger and the operating lever.

10. A cable armor cutting tool according to claim 9 which includes a plunger guiding element and means for moving said element longitudinally of the cable guide.

11. A cable armor cutting machine comprising, a fixed support, a motor mounted on said support, a saw operatively connected to said motor, a cable guide connected to the support and movable toward and away from said saw, a cable clamping means movable into and out of engagement with the cable, operating means adapted to move the clamping means into engagement with the cable at a point substantially opposite the saw and to move the cable into cutting engagement with the saw, the clamping means being a vertically movable plunger and the operating means including a lever pivotally connected at one end to the fixed support and connected to the plunger in a relation which provides a mechanical advantage to the operation of the plunger, and a cable position monitoring assembly comprising at least one sprocket wheel having teeth adapted to engage in the grooves of a cable armor and means associated with said wheel for indicating when a tooth is so engaged.

* * * * *